July 23, 1935.　　　　　P. LEONI　　　　　2,008,869
VARIABLE GEAR RATIO TRANSMISSION
Filed Dec. 24, 1934　　2 Sheets-Sheet 1
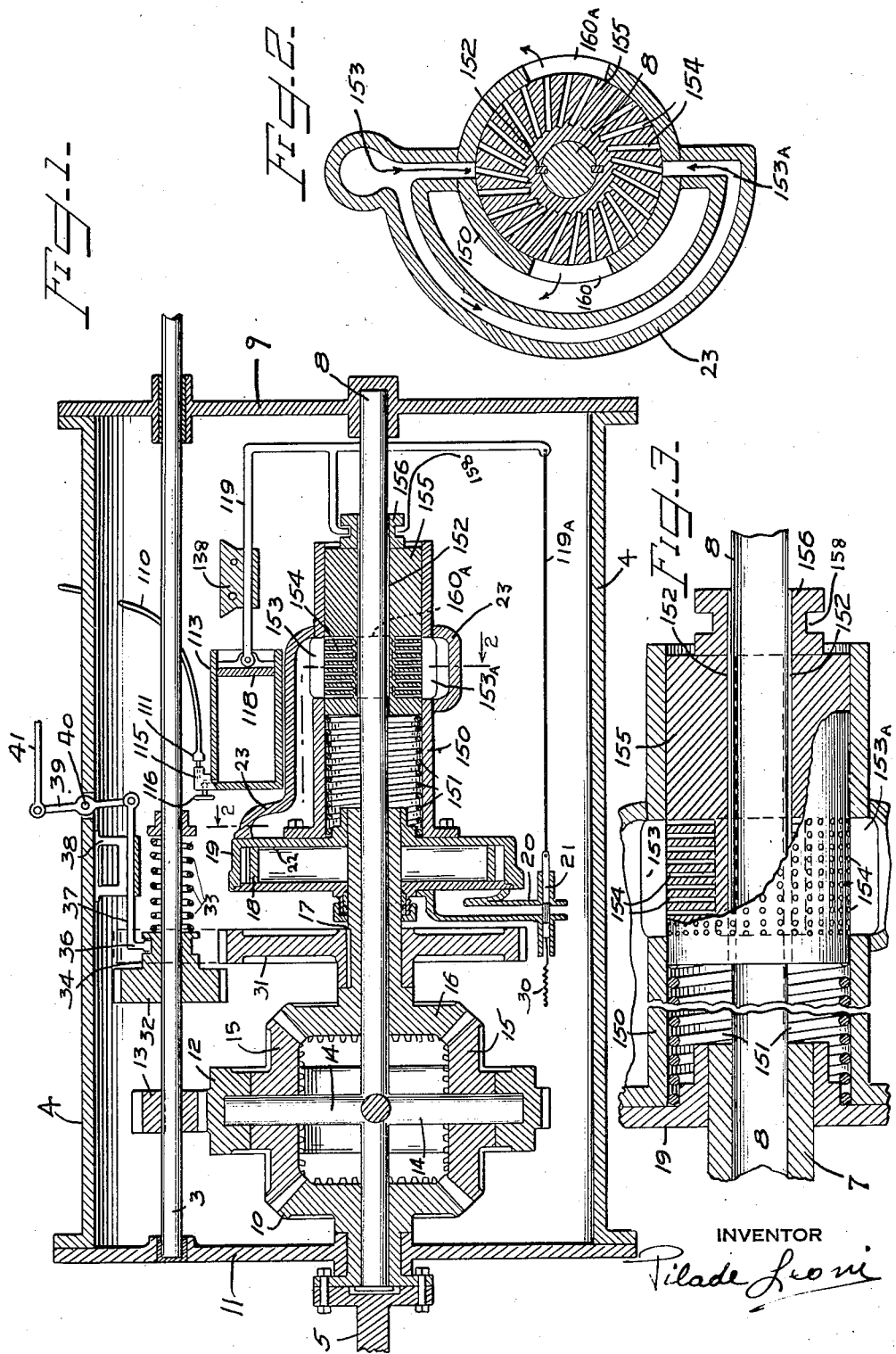
INVENTOR
Pilade Leoni

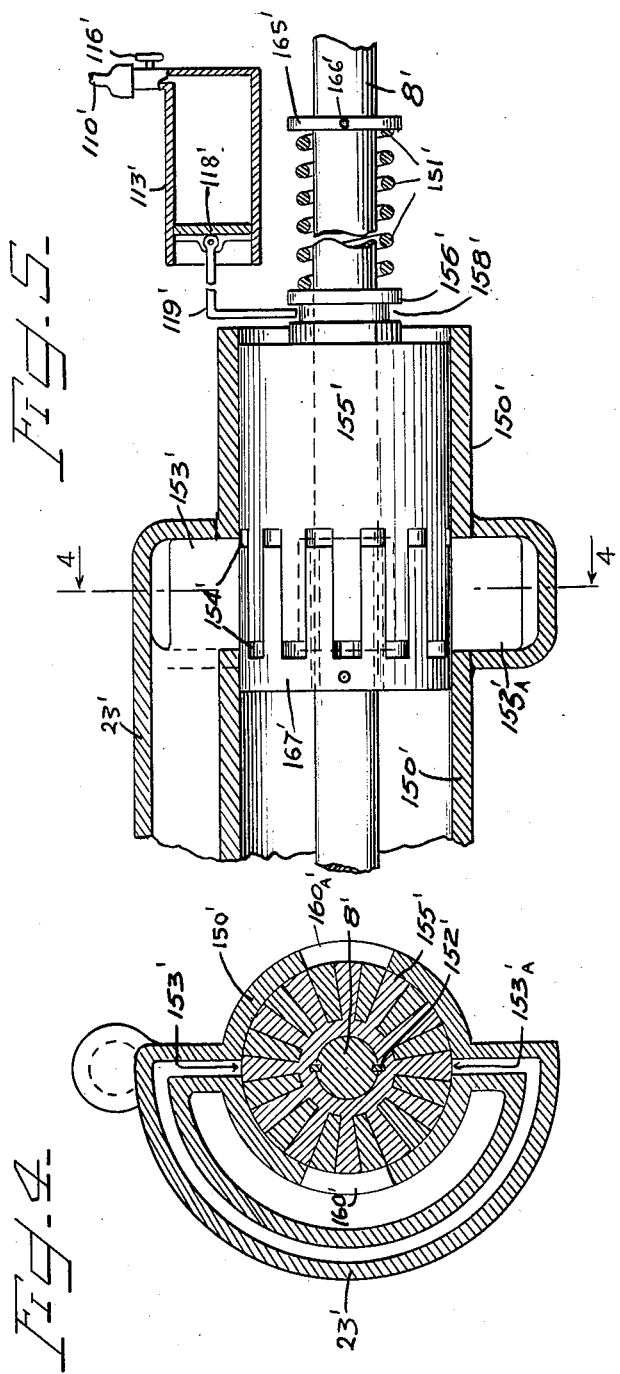

Patented July 23, 1935

2,008,869

UNITED STATES PATENT OFFICE 2,008,869

VARIABLE GEAR RATIO TRANSMISSION

Pilade Leoni, Jackson Heights, N. Y.

Application December 24, 1934, Serial No. 758,914

6 Claims. (Cl. 74—293)

My invention relates to an automatically or manually controlled variable gear ratio transmission adapted to be interposed between a driving member and a driven member to transmit power from one to the other in a positive manner and in infinitely variable ratios.

An object of my invention is to so construct my variable gear ratio transmission that the driven member can be maintained at rest while the driving member is in motion, and that motion can be imparted to the driven member gradually from rest to twice the speed of the driving member.

A further object of my invention is the provision of a fluid controlled means to control and adjust the gear ratio, that is, the speed ratio between the driving member and the driven member, and to so construct said controlling and adjusting means that for any of its settings the resultant gear ratio between the driving and the driven members will remain constant regardless of the speed at which the driving member is made to rotate.

An additional object of my invention is to so construct the fluid controlled gear ratio adjustor that the fluid always travels in the same direction with a velocity and a volume inversely related to the speed of the driven member; and also that the volume of the travelling fluid for each revolution of the driving member remains constant for any given setting of gear ratio between the driving and driven member regardless of the pressure on the fluid, or the load on the driven member.

Another object of my invention is the provision of this fluid controlled variable gear transmission in conjunction with the automatic gear ratio controller disclosed in the U. S. patent application filed by me on July 11, 1934, Serial Number 734,633. When this variable gear ratio transmission is operated in connection with said automatic controller, the driving member coupling to the driven member will always be obtained with the most efficient gear ratio with relation to the power available and the load to be carried.

An additional object of my invention is to so construct this variable gear ratio transmission that any one gear ratio from infinity to twice the speed of the driving member can be obtained between the driving and the driven member, and once obtained, it will be constantly maintained, regardless of the speed at which the driving member is caused to rotate.

The chief advantages attending this new variable gear ratio transmission operated either alone or in conjunction with my automatic controller which forms a subject matter of my U. S. patent application filed by me on July 11, 1934, Serial Number 734,633, are as follows:

It simplifies control of the operation of an automotive vehicle.

It eliminates completely gear shifting and gear levers.

It results in far greater overall efficiency than that obtained in a present day automotive vehicle.

It effects saving in fuel because of the possibility of choosing or automatically creating the most effective gear ratios.

It makes possible the use of higher gear ratios than at present obtainable.

It effects a great saving in wear and tear of the mechanical parts of an automotive vehicle.

When operated in connection with my automatic controller it will automatically return to neutral or starting position whenever pressure is removed from the controlling pedal.

It permits the use of smaller engines without impairing the general efficiency of present day automotive vehicles while greatly increasing overall efficiency, because engines can be driven at the most efficient gear ratio for any given load at any one time.

Further objects and advantages of my invention will appear from the following detailed description of the accompanying drawings in which:

Fig. 1 is a vertical section of my variable gear ratio transmission.

Fig. 2 is a vertical section taken along the lines 2—2 of Fig. 1; it shows the wells so modified as to be disposed chordially instead of radially as shown in Fig. 1.

Fig. 3 is a detail of the means for controlling the discharge of the fluid from pump 19, partly in section.

Fig. 4 is a vertical section taken along the line 4—4 of Fig. 5.

Fig. 5 is a vertical section of a modification of the variable capacity wells controlling the discharge of the fluid from the outlet manifold of pump 19 shown in Fig. 3.

Referring to the drawings in detail, shaft 3 driven by the motor, projects into chamber 4 which houses the transmission gearing according to my invention. Projecting rearwardly from the chamber 4 is a driven shaft 5. Mounted inside of the chamber 4 is a driven shaft 8 having one of its ends journalled in the end wall 9 of chamber 4 and having its other end journalled in bevel gear 10 which in turn is securely keyed to the shaft 5 and is journalled in the other end wall 11 of chamber 4. Rigidly mounted on the driving shaft 8 is a gear 12 which is always in mesh with a small gear 13 keyed to the shaft 3. Journalled on the spokes 14 which support gear 12 on the driving shaft 8 are three bevel gears 15 which are always in mesh with gear 10. Loosely mounted on the driving shaft 8 in such a way as to be always in mesh with bevel gears 15 is a bevel gear 16 identical in size and number of teeth with gear 10 and having a sleeve portion 17 on which is keyed the rotor 18 of a pump, the casing 19 of which is secured to the walls of the chamber 4. The casing of the pump is provided with an inlet manifold 20 which is controlled by a slide valve 21 normally held in closed position by a wire 119A against the action of a spring 30, which tends to keep the valve open.

Covering the outlet 22 in the pump casing 19, is manifold 23 leading to two opposite inlet openings 153 and 153A on the cylindrical sleeve 150 which is secured against rotation to the casing 19. The two mentioned inlet openings in sleeve 150 are placed opposite to one another to counterbalance pressure exerted by fluid tending to escape from the outlet manifold of the pump 19.

On the same sleeve, half-way between the above mentioned inlet openings 153 and 153A are two other openings or windows 160 and 160A; also opposite to one another. These are outlet windows.

Inside of sleeve 150, keyed for rotation with but slidable on driving shaft 8 is a cylindrical rotor 155 to which is secured collar 156 which has a circumferential groove 158 in which rides rod 119 slidingly mounted in a bracket 138. One end of rod 119 is connected with piston 118 of vacuum cylinder 113; and the other end is connected with wire 119A which controls the inlet valve 21. Between the outside casing of pump 19 and the rear end of the cylindrical rotor 155 is a compressible coil spring 151 tending to keep the rotor 155 away from case 19. That section of the cylindrical rotor 155 which registers with inlet openings 153 and 153A and outlet windows 160 and 160A, when rotor 155 is in its outmost position, has on its periphery a plurality of wells or receptacles 154. These wells or receptacles 154 may be formed at an angle with regard to the periphery so as to be better able to take advantage of centrifugal force to expel fluid through the outlet windows 160 and 160A during rotation of the rotor 155.

With reference to Fig. 2, manifold 23 allows fluid forced from the pump outlet 22 to be discharged through inlet openings 153 and 153A into the wells or receptacle 154 as, through the rotation of the rotor 155, they pass in front of, and register with the above mentioned openings in sleeve 150.

The operation of the transmission so far described is as follows:

The bevel gear 10 has a normal tendency to resist motion because it is operatively connected with the driven shaft 5 and the load. Therefore upon rotation of driving shaft 8 by shaft 3 through gears 13 and 12, the bevel gears 15 will rotate around gear 10 and will cause bevel gear 16 to rotate at twice the speed of driving shaft 8. This condition will prevail as long as valve 21 will remain closed, thus allowing no fluid to enter the inlet 20 of pump 19; however, as soon as the valve 21 starts to open and pump 19 begins delivering fluid to the outlet manifold 23; the fluid, if not allowed to escape, will build up a resistance against the rotation of the rotor of the pump, which in turn being keyed to the sleeve 17, restrains the rotation of gear 16 whereby gear 10 is caused to rotate.

However, if wells or receptacles 154 of rotor 155 are made to register with inlet openings 153 and 153A in the sleeve 150, then due to the rotation of the rotor 155, said wells or receptacles will alternately present their orifices to the inlet passage or opening 153, to the outlet window 160, to the inlet 153A, and the outlet 160A in the order mentioned, or in the reverse order, depending on the direction of rotation of rotor 155. Now, when these wells or receptacles 154 register during rotation with inlet openings 153 and 153A, they are filled to capacity by the fluid which is under pressure in the outlet manifold 23 of pump 19, and as the rotor 155 rotates, these wells or receptacles will discharge the fluid they contain into outlet openings or windows 160 and 160A; due to centrifugal force. Thus the wells of rotor 155 will continually take fluid away from manifold outlet of pump 19 and discharge it through opening or windows 160 and 160A into chamber 4 whence the fluid will again reenter inlet 20 through valve 21.

Now, if wells or receptacles 154 are in such numbers and have such a capacity so that per each one revolution of rotor 155, they are able to take away from manifold 23 as much fluid as the pump 19 is capable of delivering to them during that time, then there will be produced no restraining effort against the rotation of rotor 13 of pump 19. Therefore gear 16 can rotate freely and so no motion will be transmitted to driven shaft 5 from shaft 3 and driving shaft 8.

Now, if vacuum either from the manifold of the engine or from a separate source is impressed on the cylinder 113 through tubing 110 and regulating valve 115, then piston 118 will move inward and will carry rod 119 which in turn will cause collar 156 and rotor 155 to slide inward inside sleeve 150 against the pressure of coiled spring 151 until no more wells or receptacles 154 will register with inlet openings 153 and 154A, and outlet windows 160 and 160A during any one revolution of driving shaft 8. At this time the fluid discharged from pump 19 cannot find an escape and builds up a pressure restraining the rotation of rotor 18 of the pump 19 and so effectively restraining also the rotation of gear 16. But, if gear 16 cannot rotate, then the movement of the shaft 3 and driving shaft 8 is entirely transmitted to the driven shaft 5 which will at this time rotate at twice the speed of driving shaft 8.

Thus, it can be readily appreciated that by adjusting the position of valve 21 regulating admission of the fluid to inlet 20 of pump 19, and by adjusting the position of rotor 155 within sleeve 150; one can cause movement of shaft 3 to be transmitted to driven shaft 5 from no motion to twice the speed of driving shaft 8, thus affording the selection of practically any gear ratio; and each chosen or set gear ratio will remain constant regardless of the speed at which the driving member may be caused to rotate.

To provide finite graduations of gear ratios between driving and driven member, I replace the cylindrical rotor 155 with another rotor 155' which is divided into two parts. One part 167' is keyed rigidly to shaft 8' and the other part 155' is keyed for rotation with, but for sliding movement on shaft 8'. The facing ends of the parts 167' and 155' of the rotor are provided with male and female parts of any desired figuration so that the male parts on one facing end are adapted to slide into and exactly fit the female parts of the other section. Thus, when the facing ends of the parts are pressed together they present an unbroken periphery to the passages or openings 153' and 153A' throughout the rotation of rotor 155'. This smooth unbroken surface of the rotor presents no opportunity for the escape of fluid under compression in the outlet manifold of the pump and thus causes effective restraint of the rotation of the rotor 18 of pump 19 and consequently of gear 16. At this time all motion of shaft 3 and driving shaft 8 is transmitted positively to driven shaft 5 which rotates at twice the speed of driving shaft 8.

To permit escape of fluid from outlet of pump 19 it is necessary to pull apart the sliding section 155' of the rotor and thus form wells or receptacles 154' between the male and the female parts of the two sections of the rotor, which rotating will cause fluid to escape from the outlet manifold of the pump to an extent controlled by the capacity of said formed wells or receptacles, and by the speed of rotation of shaft 8. Inasmuch as rotor 155' is slidable on, but keyed for rotation on driving shaft 8, the resultant gear ratio between driven shaft 5 and driving shaft 8 will remain constant for any given capacity of said wells or receptacles regardless of the speed at which the driving shaft 8 is made to rotate.

I wish it to be understood that each of the various types of mechanical elements described in the foregoing and illustrated in the drawings for performing certain functions, can be replaced by any one of several equivalent mechanical elements for performing the same function.

It is also to be understood that the arrangements of the parts shown in the drawings can be varied in a great number of ways without departing from the scope of my invention.

Having thus described the nature and object of my invention and preferred embodiments of the same, which embodiments are to be taken as illustrative rather than limitative, what I now claim as new and desire to secure by Letters Patent is:

1. In a variable gear ratio transmission, in combination a driving member, a driven member, gears connecting said members comprising a pair of gears, the rotation of one of which depends on the rotation of the other, one of said gears being fixed to the driven member, the other gear being fixed for rotation with the rotor of a pump whereby the rotation of said gear is controlled by the rotation of said rotor, and means for controlling the rotation of said rotor comprising a drum driven by the driving member and mounted for rotation in the outlet manifold of said pump, wells in the periphery of said drum adapted to receive fluid from the outlet manifold of said pump, and discharge it from said manifold, and means for controlling the amount of fluid discharged by said wells in a single complete revolution of said drum.

2. A variable gear ratio transmission according to the preceding claim in which the means for controlling the amount of the fluid discharged by the wells of the drum comprise means for varying the number of the wells exposed to the interior of the outlet manifold of the pump.

3. A variable gear ratio transmission according to claim one, in which the means for controlling the amount of fluid discharged from the outlet manifold of the pump by the wells on a rotating drum, comprise means for adjusting the capacity of the wells exposed to the interior of the manifold of the pump.

4. A variable gear ratio transmission according to claim 1 comprising means for varying the volume of the discharge of the fluid from said pump during a single rotation of the driving member.

5. A variable gear ratio transmission according to claim 1 in which the means for controlling the discharge of the fluid from said pump are adapted to maintain that discharge constant for any one setting of said means during any one single rotation or fraction of rotation of the driving member, irrespective of any variation of pressure to which said fluid may be subjected.

6. A variable gear ratio transmission according to claim 1 in which means are provided for adjusting the feed of the fluid to the inlet of said pump.

PILADE LEONI.